US011443335B2

(12) United States Patent
Tang (10) Patent No.: US 11,443,335 B2
(45) Date of Patent: Sep. 13, 2022

(54) MODEL-BASED DEEP REINFORCEMENT LEARNING FOR DYNAMIC PRICING IN AN ONLINE RIDE-HAILING PLATFORM

(71) Applicant: Beijing DiDi Infinity Technology and Development Co., Ltd., Beijing (CN)

(72) Inventor: Xiaocheng Tang, San Mateo, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 311 days.

(21) Appl. No.: 16/720,753

(22) Filed: Dec. 19, 2019

(65) Prior Publication Data

US 2021/0192555 A1    Jun. 24, 2021

(51) Int. Cl.
*G06Q 30/00*    (2012.01)
*G06N 3/00*    (2006.01)
*G06Q 30/02*    (2012.01)
*G06N 3/04*    (2006.01)
*G06N 3/08*    (2006.01)

(52) U.S. Cl.
CPC ....... *G06Q 30/0206* (2013.01); *G06N 3/0445* (2013.01); *G06N 3/0454* (2013.01); *G06N 3/08* (2013.01)

(58) Field of Classification Search
CPC ...................... G06Q 10/00–50/00; G06N 3/00
USPC .............................................. 705/7.11–7.42
See application file for complete search history.

(56) References Cited

U.S. PATENT DOCUMENTS

| 10,706,487 | B1 * | 7/2020 | Chachra ................. G06N 7/005 |
| 2013/0246207 | A1 | 9/2013 | Novak et al. |
| 2016/0247095 | A1 * | 8/2016 | Scicluna ................ G06Q 10/02 |
| 2017/0293925 | A1 * | 10/2017 | Marueli ............ G06Q 30/0206 |
| 2017/0351987 | A1 * | 12/2017 | Liu ................. G06Q 10/06311 |
| 2018/0293497 | A1 | 10/2018 | Ravindran et al. |
| 2019/0107404 | A1 | 4/2019 | Zhong et al. |
| 2020/0408537 | A1 * | 12/2020 | Wang .................... H04W 4/025 |

FOREIGN PATENT DOCUMENTS

| CN | 105184726 A | 12/2015 |
| CN | 109544196 A | 3/2019 |

OTHER PUBLICATIONS

Eduardo F. Camacho et al., "Model Predictive Control", Advanced Textbooks in Control and Signal Processing. Springer, Second Edition, London, 2004.

(Continued)

*Primary Examiner* — Mustafa Iqbal
(74) *Attorney, Agent, or Firm* — Sheppard Mullin Richter & Hampton LLP (57) ABSTRACT

Dynamic pricing may be applied in an online ride-hailing platform. Information may be obtained. The information may include a set of pricing candidates and an initial status of a ride-hailing platform. The set of pricing candidates may be updated based on the initial status of the ride-hailing platform to minimize a cross-entropy between the set of pricing candidates and a target pricing policy that maximizes a total income of the ride-hailing platform. A price for at least one current trip request on the ride-hailing platform may be generated based on the updated set of pricing candidates.

16 Claims, 6 Drawing Sheets

(56) References Cited

OTHER PUBLICATIONS

Kurtland Chua et al., Deep Reinforcement Learning in a Handful of Trials Using Probabilistic Dynamics Models. Advances in Neural Information Processing Systems 31, pp. 4754-4765. Curran Associates, Inc., 2018.
Diederik P. Kingma et al., Auto-Encoding Variational Bayes. 2nd International Conference on Learning Representations, ICLR 2014, Banff, AB, Canada, Apr. 14-16, 2014, Conference Track Proceedings, 2014.
Reuven Y. Rubinstein, "Optimization of Computer Simulation Models with Rare Events", European Journal of Operational Research, 99(1), pp. 89-112, 1997.
PCT International Search Report and the Written Opinion dated Mar. 18, 2021, issued in related International Application No. PCT/CN2020/137440 (9 pages).

* cited by examiner

FIG. 1

Algorithm 1 Pricing Planning with Cross Entropy Method

1: input:
   - the pricing model (1)
   - $H$ the planning horizon,
   - $A$ top number of action candidates to keep,
   - $B$ size of action candidate population,
   - $K$ number of optimization iterations,
   - $o_0$ the initial observation, 2: Initialize the belief over action sequences $q(a_{0:H}) \leftarrow \text{Normal}(0, \mathbb{I})$
3: for $\kappa = 1, 2, \cdots, K$ do
4:     Generate action candidate population $\mathbf{a}^{(0)}, \mathbf{a}^{(1)}, \ldots, \mathbf{a}^{(B-1)} \sim q(a_{0:H})$
5:     Obtain $R^{(i)}$ by applying the subroutine pricingModelSimulator($\mathbf{a}^{(i)}$, $o_0$) for each $i \in \{0, 1, \ldots, B-1\}$
6:     Obtain the set of top action candidates to keep $C \leftarrow argsort(\{R^{(i)}\}_{i=0}^{B-1})_{1:A}$
7:     Fit the belief to the top action sequences $$\mu_{0:H} = \frac{1}{A} \sum_{i \in C} a^{(i)}, \quad \sigma_{0:H} = \frac{1}{A-1} \sum_{i \in C} |a^{(i)} - \mu|$$

8:     $q(a_{0:H}) \leftarrow \text{Normal}(\mu_{0:H}, \sigma_{0:H}^2 \mathbb{I})$
9: end for
10: return $a_0 \leftarrow \mu_0$

FIG. 2A

Algorithm 2 pricingModelSimulator($a_{0:H}$, $o_0$)
1: input:
   - the pricing model (1)
   - $H$ the planning horizon,
   - $o_0$ the initial observation,
   - $a_{0:H}$ the action for each time step along the horizon
2: Sample from the join state distribution from the transition and the state model:

$$s_{0:H+1} \sim p(s_0|o_0)\Pi_{k=1}^{H+1} p(s_k|s_{k-1}, a_{k-1})$$

3: Apply the reward model: $R = \sum_{k=1}^{H+1} E[p(r_k|s_k)]$
4: return $R$

MODEL-BASED DEEP REINFORCEMENT LEARNING FOR DYNAMIC PRICING IN AN ONLINE RIDE-HAILING PLATFORM

TECHNICAL FIELD

The disclosure relates generally to generating dynamic prices in online ride-hailing platforms. The Dynamic prices may be generated based on model-based deep reinforcement learning.

BACKGROUND

Online ride-hailing platforms are fast becoming essential components of the modern transit infrastructure. A central issue of transportation systems is how to reduce the inefficiencies due to limited supply (i.e., drivers) and asymmetric demand (i.e., passengers) across time and space. This long-standing issue may have a great impact on society and everyday life. Such inefficiencies may be greatly reduced by exploiting the direct access to the large amounts of real-time transit information which is provided by online ride-hailing systems.

SUMMARY

Various embodiments of the specification include, but are not limited to, systems, methods, and non-transitory computer readable media for dynamic pricing.

In various implementations, a method may include obtaining information. The obtained information may include a set of pricing candidates and an initial status of a ride-hailing platform. The method may further include updating the set of pricing candidates based on the initial status of the ride-hailing platform to minimize a cross-entropy between the set of pricing candidates and a target pricing policy that maximizes a total income of the ride-hailing platform. The method may further include generating a price for at least one current trip request on the ride-hailing platform based on the updated set of pricing candidates.

In another aspect of the present disclosure, a computing system may comprise one or more processors and one or more non-transitory computer-readable memories coupled to the one or more processors and configured with instructions executable by the one or more processors. Executing the instructions may cause the system to perform operations. The operations may include obtaining information. The obtained information may include a set of pricing candidates and an initial status of a ride-hailing platform. The operations may further include updating the set of pricing candidates based on the initial status of the ride-hailing platform to minimize a cross-entropy between the set of pricing candidates and a target pricing policy that maximizes a total income of the ride-hailing platform. The operations may further include generating a price for at least one current trip request on the ride-hailing platform based on the updated set of pricing candidates.

Yet another aspect of the present disclosure is directed to a non-transitory computer-readable storage medium configured with instructions executable by one or more processors to cause the one or more processors to perform operations. The operations may include obtaining information. The obtained information may include a set of pricing candidates and an initial status of a ride-hailing platform. The operations may further include updating the set of pricing candidates based on the initial status of the ride-hailing platform to minimize a cross-entropy between the set of pricing candidates and a target pricing policy that maximizes a total income of the ride-hailing platform. The operations may further include generating a price for at least one current trip request on the ride-hailing platform based on the updated set of pricing candidates.

In some embodiments, the initial status of the ride-hailing platform may include a number of available drivers and a number of trip requests from passengers of the ride-hailing platform.

In some embodiments, the initial status of the ride-hailing platform may include a status of at least one origin-destination (OD) pair associated with an origin grid region and a destination grid region.

In some embodiments, the status of the at least one OD pair may include: a running estimate of a number of created orders, a number of accepted orders at a set of price increment, a number of finished orders at the set of price increment, and a number of canceled orders due to time running out.

In some embodiments, the set of pricing candidates may include a plurality of historical pricing sequences sampled from a set of historical pricing sequences.

In some embodiments, the set of pricing candidates may include a plurality of randomly generated pricing sequences.

In some embodiments, updating the set of pricing candidates may include iteratively performing the following steps. The obtained information may be input into a trained reinforcement learning (RL) model. A cumulative reward may be obtained from the trained RL model for each pricing candidate in the set of pricing candidates based on the initial status of the ride-hailing platform. A set of top pricing candidates may be obtained, and may include one or more pricing candidates with the highest cumulative rewards. The set of pricing candidates may be updated based on the set of top pricing candidates.

In some embodiments, obtaining the cumulative reward from the trained RL model may include obtaining an initial state of a simulation of the ride-hailing platform based on the initial status of the ride-hailing platform. A set of future states of the simulation of the ride-hailing platform may be obtained based on the set of pricing candidates, the initial status of the ride-hailing platform, and the initial state of the simulation of the ride-hailing platform. The cumulative reward may be generated based on the set of future states of the simulation of the ride-hailing platform.

In some embodiments, generating the cumulative reward based on the set of future states of the simulation of the ride-hailing platform may include summing a state reward for each state of the set of future states of the simulation of the ride-hailing platform.

In some embodiments, the trained RL model may include a transition neural network configured for determining a prediction of each future state of the simulation of the ride-hailing platform based on a previous state of the simulation of the ride-hailing platform and a previous pricing action. The trained RL model may further include an observation neural network configured for determining a set of future observations of the simulation of the ride-hailing platform based on each future state of a simulation of the ride-hailing platform. The trained RL model may further include a state neural network configured for determining each future state of the simulation of the ride-hailing platform based on each future observation of the simulation of the ride-hailing platform. The trained RL model may further include a reward neural network configured for determining each state reward based on each future state of the simulation of the ride-hailing platform.

In some embodiments, the trained RL model may be trained by maximizing a predicted accumulative reward.

In some embodiments, the trained RL model may include a recurrent neural network configured for determining a set of recurrent states of the simulation of the ride-hailing platform based on a set of pervious recurrent states of the simulation of the ride-hailing platform, a set of previous states of the simulation of the ride-hailing platform, and a set of previous pricing actions of the simulation of the ride-hailing platform. The trained RL model may further include a transition neural network configured for determining a prediction of each future state of the simulation of the ride-hailing platform based on each recurrent state of the simulation of the ride-hailing platform. The trained RL model may further include an observation neural network configured for determining a set of future observations of the simulation of the ride-hailing platform based on each recurrent state of the simulation of the ride-hailing platform and each future state of the simulation of the ride-hailing platform. The trained RL model may further include a state neural network configured for determining each future state of the simulation of the ride-hailing platform based on a set of previous observations the simulation of the ride-hailing platform and the set of previous pricing actions. The trained RL model may further include a reward neural network configured for determining each state reward based on each recurrent state of the simulation of the ride-hailing platform and each future state of the simulation of the ride-hailing platform.

In some embodiments, the trained RL model may be trained by: maximizing a data log-likelihood of obtaining each future observation and each state reward, and minimizing a divergence between each future state and each prediction of each future state.

In some embodiments, generating the price for the at least one current trip request may include generating a pricing multiplier for multiplying with a base price of the at least one current trip request.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein may generate dynamic pricing in online ride-hailing platforms based on model-based deep reinforcement learning. Dynamic pricing may be used as a tool to balance demand and supply (i.e., rebalancing) on a ride-hailing platform. Pricing strategies may have a spatial-temporal effect of on an entire ride-hailing system. For example, whenever a customer engages a vehicle, it not only decreases the instantaneous availability at the source location, but also affects the future availability at all other locations in the system. A model-based deep reinforcement learning system may optimize the transit efficiency through dynamic pricing by explicitly learning and planning for spatial-temporal effects.

A hybrid approach which combines an expert system and a data driven system may be used to generate prices. Expert systems may accurately model the relationships and behaviors between supply and demand based on human input. However, expert driven systems may be slow to update. Data driven systems allow a model to interact with the environment through trial and error. The results of the interactions may be monitored, and the model may be adjusted accordingly. However, pricing errors in a ride-hailing platform may be costly. In some embodiments, a combinational approach may train a data driven model in an offline simulation environment, and apply the trained pricing model to the online ride-hailing platform. The offline training may include training a neural network through deep learning to learn the dynamics of the system. For example, the trained reinforcement learning (RL) model described in more detail with relation to the pricing model component 114 of FIG. 1 below may be trained by maximizing the expected accumulative rewards or based on a variational bound on the data log-likelihood. Data may be collected (i.e., observations) after the pricing model is deployed online. For example, the information obtained by information obtaining component 112 of FIG. 1 may include the observations. The observations may then be used to retrain the pricing model. This process may be repeated until there is a convergence between the predictions from the model and the observations. For example, the updated set of pricing candidates of information obtaining component 112 of FIG.

Figure 1:
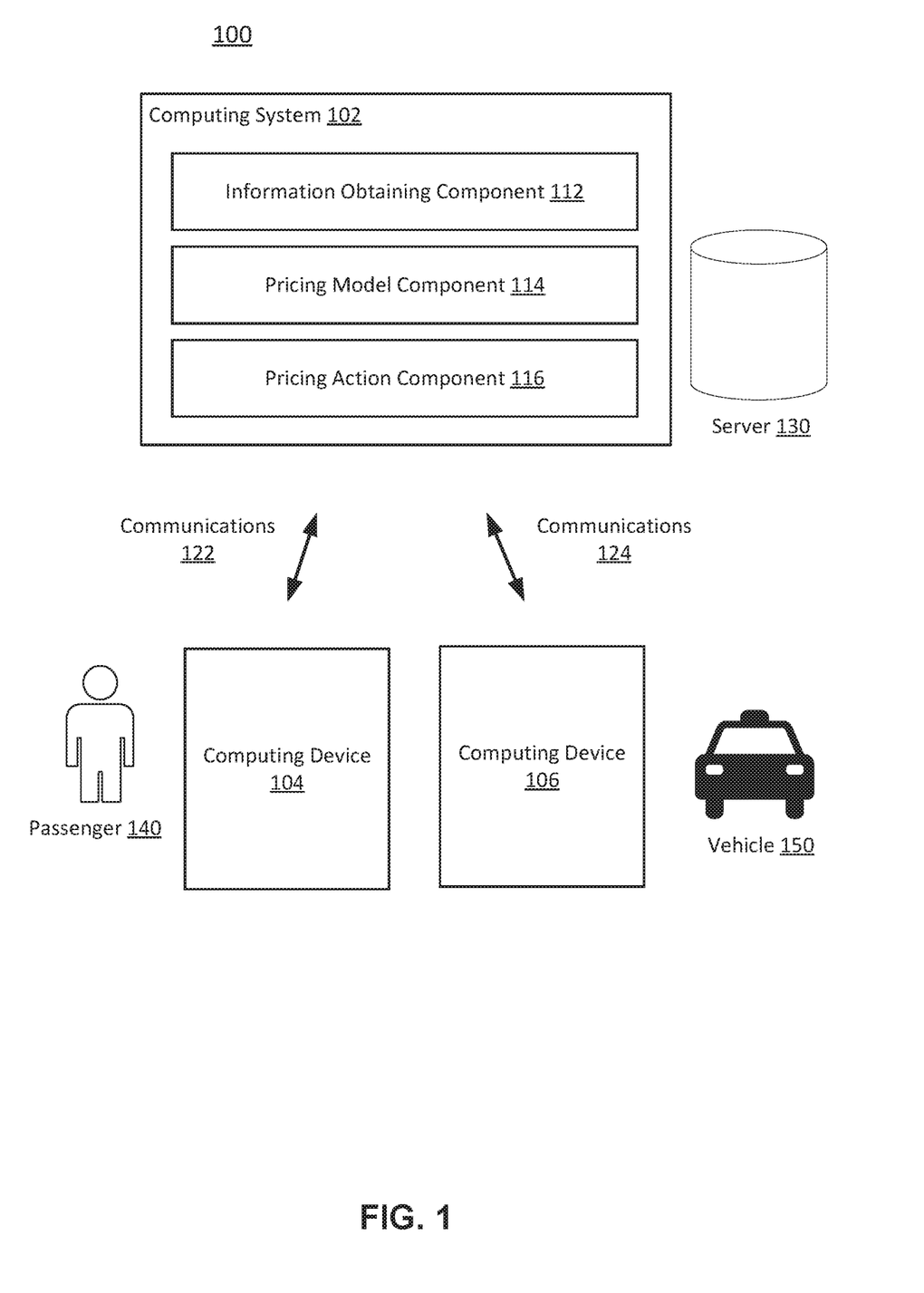
FIG. 1 illustrates an exemplary system to which techniques for dynamic pricing may be applied, in accordance with various embodiments.

1 may be based on the convergence. The combinational approach may be more efficient and reach convergence faster.

FIG. 1 illustrates an exemplary system 100 to which techniques for dynamic pricing may be applied, in accordance with various embodiments. The example system 100 may include a computing system 102, a computing device 104, and a computing device 106. It is to be understood that although two computing devices are shown in FIG. 1, any number of computing devices may be included in the system 100. Computing system 102 may be implemented in one or more networks (e.g., enterprise networks), one or more endpoints, one or more servers (e.g., server 130), or one or more clouds. The server 130 may include hardware or software which manages access to a centralized resource or service in a network. A cloud may include a cluster of servers and other devices which are distributed across a network.

The computing devices 104 and 106 may be implemented on or as various devices such as a mobile phone, tablet, server, desktop computer, laptop computer, etc. The computing devices 104 and 106 may each be associated with one or more vehicles (e.g., car, truck, boat, train, autonomous vehicle, electric scooter, electric bike, etc.). The computing devices 104 and 106 may each be implemented as an in-vehicle computer or as a mobile phone used in association with the one or more vehicles. The computing system 102 may communicate with the computing devices 104 and 106, and other computing devices. Computing devices 104 and 106 may communicate with each other through computing system 102, and may communicate with each other directly. Communication between devices may occur over the internet, through a local network (e.g., LAN), or through direct communication (e.g., BLUETOOTH™, radio frequency, infrared).

In some embodiments, the system 100 may include a ride-hailing platform. The ride-hailing platform may facilitate transportation service by connecting drivers of vehicles with passengers. The platform may accept requests for transportation from passengers, identify idle vehicles to fulfill the requests, arrange for pick-ups, and process transactions. For example, passenger 140 may use the computing device 104 to order a trip. The trip order may be included in communications 122. The computing device 104 may be installed with a software application, a web application, an API, or another suitable interface associated with the ride-hailing platform.

The computing system 102 may receive the request and reply with price quote data and price discount data for one or more trips. The price quote data and price discount data for one or more trips may be included in communications 122. When the passenger 140 selects a trip, the computing system 102 may relay trip information to various drivers of idle vehicles. The trip information may be included in communications 124. For example, the request may be posted to computing device 106 carried by the driver of vehicle 150, as well as other commuting devices carried by other drivers. The driver of vehicle 150 may accept the posted transportation request. The acceptance may be sent to computing system 102 and may be included in communications 124. The computing system 102 may send match data to the passenger 140 through computing device 104. The match data may be included in communications 122. The match data may also be sent to the driver of vehicle 150 through computing device 106 and may be included in communications 124. The match data may include pick-up location information, fees, passenger information, driver information, and vehicle information. The matched vehicle may then be dispatched to the requesting passenger. The fees may include transportation fees and may be transacted among the system 102, the computing device 104, and the computing device 106. The fees may be included in communications 122 and 124. The communications 122 and 124 may additionally include observations of the status of the ride-hailing platform. For example, the observations may be included in the initial status of the ride-hailing platform obtained by information component 112 and described in more detail below.

While the computing system 102 is shown in FIG. 1 as a single entity, this is merely for ease of reference and is not meant to be limiting. One or more components or one or more functionalities of the computing system 102 described herein may be implemented in a single computing device or multiple computing devices. The computing system 102 may include an information obtaining component 112, a pricing model component 114, and a pricing action component 116. The computing system 102 may include other components. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and one or more memories (e.g., permanent memory, temporary memory, non-transitory computer-readable storage medium). The one or more memories may be configured with instructions executable by the one or more processors. The processor(s) may be configured to perform various operations by interpreting machine-readable instructions stored in the memory. The computing system 102 may be installed with appropriate software (e.g., platform program, etc.) and/or hardware (e.g., wires, wireless connections, etc.) to access other devices of the system 100.

The information obtaining component 112 may be configured to obtain information. The obtained information may include a set of pricing candidates and an initial status of a ride-hailing platform. Obtaining information may include one or more of accessing, acquiring, analyzing, determining, examining, identifying, loading, locating, opening, receiving, retrieving, reviewing, storing, or otherwise obtaining the information. In some embodiments, the obtained information may be part of a Partially Observable Markov Decision Process (POMDP) that is used to model an order-dispatching task in a multi-agent setting. For example, a POMDP may be used to determine the price for a ride on an online ride-hailing platform. Observations made by the ride-hailing platform generally may not reveal the full state of the environment. Hidden variables exist which may not be observable. For example, the hidden variables may include price elasticity of demand (i.e., how much a passenger is willing to pay for a ride).

In some embodiments the set of pricing candidates may include potential pricing actions for trips on the ride-hailing platform. In some embodiments, the set of pricing candidates may include an individual fare (e.g., $10). In some embodiments, set of pricing candidates may include pricing multipliers for multiplying with a base price of a trip request. For example, a pricing action may be either discrete or continuous. For example, a discrete action may be selected from the set {0.4, 0.7, 1.0, 1.3, 1.6}. If the multiplier is set to 0.7, then the base price may be multiplied by 0.7. In some embodiments, the set of pricing candidates may include a plurality of randomly generated pricing sequences. For example, pricing sequences may be randomly generated in order to achieve a normal distribution of pricing candidates. In some embodiments, the set of pricing candidates may include a plurality of historical pricing sequences sampled from a set of historical pricing sequences. In some embodiments, the set of historical pricing sequences may include a set of actions (e.g., pricing actions) taken during sequential timesteps. For example, one or more components of computing system 102 may interact with an environment of the ride-sharing platform through a reinforcement learning process. Interactions may occur episodically at some discrete time scale, $t \in \{0, 1, 2, \ldots, T\}$ until a terminal time step T is reached. On each time step, t, the full state of environment $s_t$ may generate the observation that the controller perceives $o_t \in O$. A pricing action $a_t \in A_{o_t}$ that terminates in t+1 may be chosen based on the observation. As a response, the environment may transition from $s_t$ to $s_{t+1}$ while producing a numerical reward $r_t$, which is the total price of all orders finished during the transition. In some embodiments, the set of pricing candidates may include the candidate actions described with respect to FIG. 2A below.

In some embodiments, regional-based features of the observations may be based on multiple running estimates of supply and demand conditions. In some embodiments, the initial observation may include a state of a ride-hailing platform. The state may include supply conditions and demand conditions of the ride-hailing platform. In some embodiments, the initial status of the ride-hailing platform may include a number of available drivers and a number of trip requests from passengers of the ride-hailing platform. For example, at each timestep, a current number of available drivers and a current number of trip requests from passengers may be obtained. In some embodiments, a hexagon tiling system may be used to quantize a geographical space into n smaller non-overlapping grid cells. The ride-hailing platform may include Origin-Destination (OD) pairs of trips. The OD pairs may be represented as ij, where the origin i and the destination j enumerate a set of grid cells (e.g., i, $j \in \{1, 2, \ldots, n\}$), resulting in a total of $n^2$ such pairs. In some embodiments, the initial status of the ride-hailing platform may include a status of at least one origin-destination (OD) pair associated with an origin grid region and a destination grid region. The origin grid region and the destination grid region may fall within the same grid cell or different grid cells. The status of the at least one OD pair may include a running estimate with exponential decay of the following quantities: 1) a number of created orders; 2) a number of accepted orders at each price increment; 3) a number of finished orders at each price increment; and 4) a number of canceled orders due to time running out. In some embodiments, an observation $o_t$ may be represented by the four quantities plus the current time of the system.

Figure 2A:
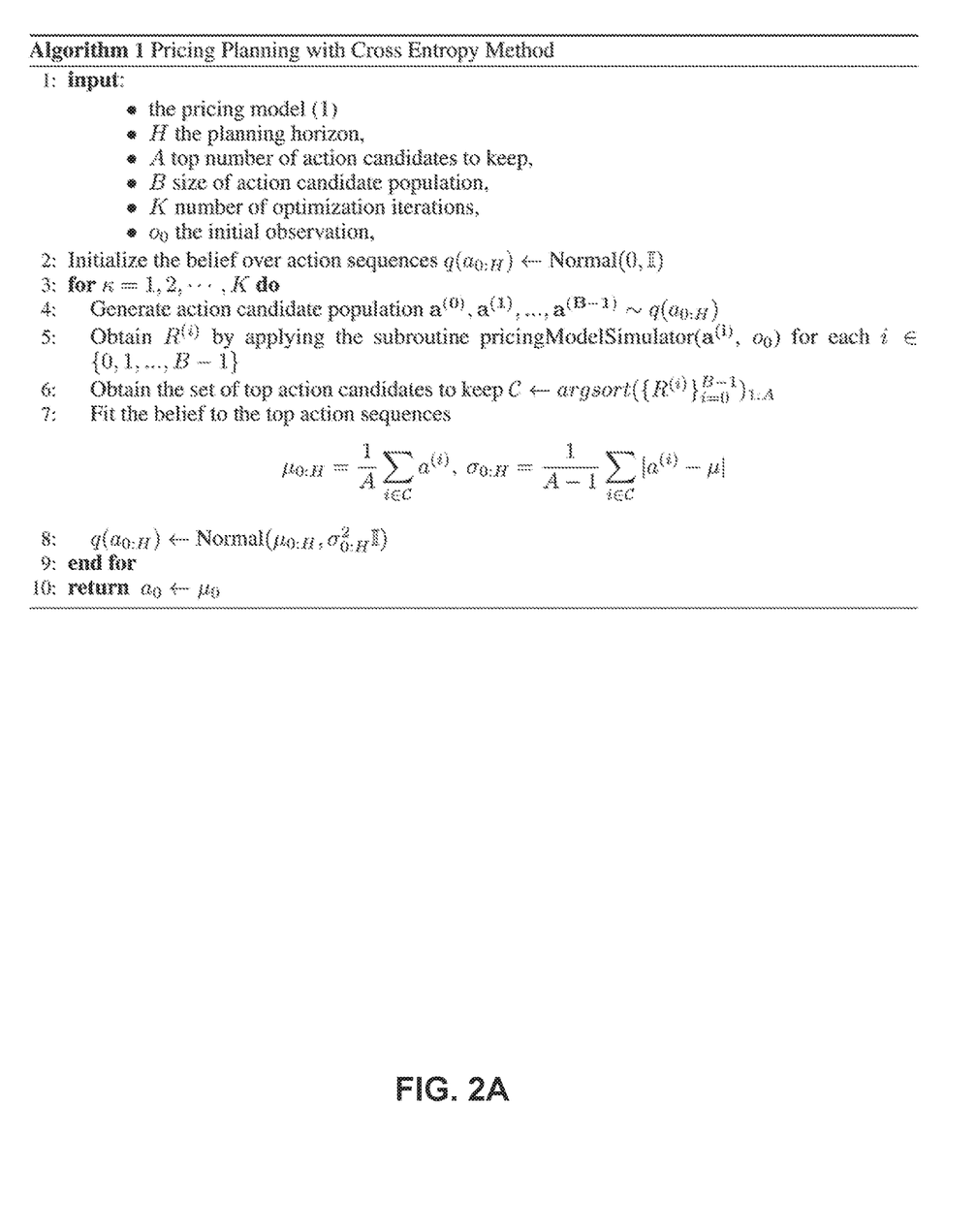
FIG. 2A illustrates an exemplary algorithm for price planning, in accordance with various embodiments.

The pricing model component 114 may be configured to update the set of pricing candidates based on the initial status of the ride-hailing platform to minimize a cross-entropy between the set of pricing candidates and a target pricing policy that maximizes a total income of the ride-hailing platform. The cross entropy method (CEM) may be used to iteratively minimize the cross-entropy between a distribution of price candidates and a target pricing policy. As a result, an optimal pricing action may be generated. CEM may generate an optimized result through importance sampling of an initial distribution. First, a candidate population may be sampled from the initial distribution. Next, the cross-entropy between the candidate population and a target distribution may be minimized to generate a better candidate population for the next iteration. The process may repeat until convergence is reach. The cross-entropy between two probability distributions may represent the average number of events required for the two probability distributions to produce the same result. In some embodiments, a fixed number of iterations may be used to approximate convergence. An exemplary implementation of CEM is illustrated by FIG. 2A and described in more detail below.

In some embodiments, updating the set of pricing candidates may include iteratively performing the following steps. The obtained information may be input into a trained reinforcement learning (RL) model. A cumulative reward may be obtained from the trained RL model for each pricing candidate in the set of pricing candidates based on the initial status of the ride-hailing platform. A set of top pricing candidates may be obtained, and may include one or more pricing candidates with the highest cumulative rewards. The set of pricing candidates may be updated based on the set of top pricing candidates. The trained RL model may be trained with the goal of implementing a pricing policy $p(a_t | o_{\leq t}, a_{<t})$ that maximizes the expected accumulative rewards $E[\Sigma_{t=0}^{T}]$ (e.g., the total income of the platform). The pricing policy may determine current action $a_t$ based on all previous observations $o_{\leq t}$ and all previous actions $a_{<t}$. The expected accumulative rewards may include a summation of the reward $r_t$ at each timestep until the terminal timestep T is reached.

In some embodiments, obtaining the cumulative reward from the trained RL model may include obtaining an initial state of a simulation of the ride-hailing platform based on the initial status of the ride-hailing platform. A set of future states of the simulation of the ride-hailing platform may be obtained based on the set of pricing candidates, the initial status of the ride-hailing platform, and the initial state of the simulation of the ride-hailing platform. The cumulative reward may be generated based on the set of future states of the simulation of the ride-hailing platform. In some embodiments, generating the cumulative reward based on the set of future states of the simulation of the ride-hailing platform may include summing a state reward for each state of the set of future states of the simulation of the ride-hailing platform.

In some embodiments, the pricing model may be a generative model of the relation between hidden variables and the observable state. In some embodiments, the pricing model may include a transition neural network, an observation neural network, a state neural network, and a reward neural network. These models may define the generative dynamics of a POMDP. The neural network may include probabilistic models used to predict full probability distributions in order to account for noise (i.e., the variance and stochasticity between states). The probability distributions will include a variance in addition to the single predicted mean value. Exemplary neural networks are listed below using probability notation. The examples use the conditional probability notation p(A|B). This notation indicates that the probability of A may be given based on observation B.

In some embodiments, the transition neural network may be defined as:

$$\text{Transition model: } s_t \sim p(s_{t-1}, a_{t-1}) \quad (1)$$

The transition model may determine a prediction of current state $s_t$ at current timestep t based on previous state $s_{t-1}$ and previous action $a_{t-1}$ at the previous timestep t−1. During simulations, the transition neural network may determine a prediction of each future state of the simulation of the ride-hailing platform based on a previous state of the simulation of the ride-hailing platform and a previous pricing action.

In some embodiments, the observation neural network may be defined as:

Observation model: $o_t \sim p(o_t|s_t)$ (2)

The observation model may determine current observation $o_t$ based on the current state $s_t$. In some embodiments, state $s_t$ may not be observed and it may be assumed that state $s_t$ generates the observation $o_t$. During simulations, the observation neural network may determine a set of future observations of the simulation of the ride-hailing platform based on each future state of a simulation of the ride-hailing platform.

In some embodiments, the state neural network may be defined as:

State model: $s_t \sim p(s_t|o_t)$ (3)

The state model may determine current state $s_t$ based on the current observation $o_t$. During simulations, the state neural network may determine each future state of the simulation of the ride-hailing platform based on each future observation of the simulation of the ride-hailing platform.

In some embodiments, the reward neural network may be defined as:

Reward model: $r_t \sim p(r_t|s_t)$ (4)

The reward model may determine reward $r_t$ based on the current state $s_t$. During simulations, the reward neural network may determine each state reward based on each future state of the simulation of the ride-hailing platform.

In some embodiments, variational recurrent learning may be used in order to reliably remember information for multiple time steps. In this embodiment, the pricing model may be instantiated with a recurrent neural network $f(h_{t-1}, s_{t-1}, a_{t-1})$. The recurrent neural network may be defined as:

Recurrent model: $h_t = f(h_{t-1}, s_{t-1}, a_{t-1})$ (5)

The recurrent model may determine current recurrent state $h_t$ at timestep t based on previous recurrent state $h_{t-1}$, previous state $s_{t-1}$, and previous action $a_{t-1}$. The current recurrent state $h_t$ may include the current recurrent state of the recurrent neural network. During simulations, the recurrent neural network may determine a set of recurrent states of the simulation of the ride-hailing platform based on a set of pervious recurrent states of the simulation of the ride-hailing platform, a set of previous states of the simulation of the ride-hailing platform, and a set of previous pricing actions of the simulation of the ride-hailing platform.

In some embodiments, the transition neural network may be defined as:

Transition model: $s_t \sim p(s_t|h_t)$ (6)

The transition model may determine current state $s_t$ based on current recurrent state $h_t$. During simulations, the transition neural network may determine a prediction of each future state of the simulation of the ride-hailing platform based on each recurrent state of the simulation of the ride-hailing platform.

In some embodiments, the observation neural network may be defined as:

Observation model: $o_t \sim p(o_t|h_t, s_t)$ (7)

The observation model may determine current observation $o_t$ based on the current recurrent state $h_t$ and the current state $s_t$. During simulations, the observation neural network may determine a set of future observations of the simulation of the ride-hailing platform based on each recurrent state of the simulation of the ride-hailing platform and each future state of the simulation of the ride-hailing platform.

In some embodiments, the state neural network may be defined as:

State model: $s_t \sim p(s_t|o_{\leq t}, a_{<t})$ (8)

The state model may determine current state $s_t$ based on all previous observations $o_{\leq t}$ and all previous actions $a_{<t}$. During simulations, the state neural network may determine each future state of the simulation of the ride-hailing platform based on a set of previous observations the simulation of the ride-hailing platform and the set of previous pricing actions.

In some embodiments, the reward neural network may be defined as:

Reward model: $r_t \sim p(r_t|h_t, s_t)$ (9)

The reward model may determine reward $r_t$ based on the current recurrent state $h_t$ and the current state $s_t$. During simulations, the reward neural network may determine each state reward based on each recurrent state of the simulation of the ride-hailing platform and each future state of the simulation of the ride-hailing platform.

In some embodiments, an image-based representation may be constructed from features of a ride hailing platform. A convolutional neural network may be employed to capture the geo-locality of regions. For example, a targeted city quantized into n regions with four supply and demand quantities monitored for each OD pair may constitute an image of size n×n×4, with each quantity constructed as one channel in the image. To process observations as an image, a convolutional neural network may be used to parameterize the mean and variance of a diagonal Gaussian used to approximate the state model $p(s_t|o_t)$, and a deconvolutional neural network may be used to parameterize the observation model $p(o_t| h_t, s_t)$ which is represented as a Gaussian with identity covariance. The transition model and the reward model may both be Gaussian with the mean parameterized by a feed-forward neural network with identity (i.e., unit) variance.

In some embodiments, the trained RL model may be trained by: maximizing a data log-likelihood of obtaining each future observation and each state reward, and minimizing a divergence between each future state and each prediction of each future state. The recurrent neural network pricing model may be trained by collecting from the environment the historical pricing trajectories $\{o_t, a_t, r_t\}_{t=0}^T$. From this, the training objective may be a variational bound on the data log-likelihood.

$$\sum_{t=0}^{T} (E_{p(s_t|o_{\leq t}, a_{<t})}[\ln p(o_t | h_t, s_t) + \ln p(r_t | h_t, s_t)] - \quad (10)$$

$$E_{p(s_{t-1}|o_{\leq t-1}, a_{t-1})}[KL[p(s_t | o_{\leq t}, a_{<t}) || p(s_t | h_t)]])$$

The first part of the training objective may be to maximize the data log-likelihood of both the observation model and the reward model. The second part of the training objective may be to minimize the complexity. The complexity may be minimized using Kullback-Leibler (KL) divergence optimization. The KL divergence between the predicted state distribution and the observations may be minimized. The training objective may be optimized using reparameterization of the variational bound such that stochastic gradient descent may be applied.

FIG. 2A illustrates an exemplary algorithm for price planning, in accordance with various embodiments. In some embodiments, the algorithm may be implemented by the pricing model component 114 of FIG. 1. In some embodiments, the pricing policy may be implemented as a planning algorithm that searches for the best sequence of future actions. Model-predictive control (MPC) may be used, and re-plan at each step by incorporating new observations into the planning. CEM may be implemented due to its parallelizability and fast convergence.

The algorithm illustrated in FIG. 2A may receive as inputs a pricing model, a planning horizon H, a number of top action candidates to keep A, a size of the action candid population B, a number of optimization iterations K, and an initial observation $o_0$. A belief may be initialized over a distribution of action sequences by normalizing the distribution with a center at zero. The set of action sequences may then be iteratively updated K times using a loop. In some embodiments, the loop may begin with the pricing model generating a set of action candidates. The set of action candidates may be generated based on the set of historical action sequences. In some embodiment, the set of action candidates may be included in the pricing candidates obtained by information obtaining component 112 of FIG. 1.

In some embodiments, the set of action candidates and the initial observation may be input into a simulator model. In some embodiments, the simulator model may include obtaining an initial state based on the initial observation. A state distribution may be obtained based on the set of historical action sequences, the initial observation, and the initial state. A reward may be generated based on the state distribution. For example, the simulator model may include the pricing simulation algorithm illustrated in FIG. 2B below. A reward $R^{(i)}$ may be obtained from the simulator model for each action candidate in the set of action candidates, and a set of top action candidates may be obtained. For example, the set of action candidates may be sorted based on the reward corresponding to each action candidate. The top action candidates (e.g., top fifty) with the highest reward may be selected. A set of new action sequences may be generated based on a distribution of the set of top action candidates. Mean $\mu_{0:H}$ and standard deviation $\sigma_{0:H}$ may be calculated for the distribution. The set of new action sequences may be generated by normalizing the distribution with a new center at mean $\mu_{0:H}$. For example, the new center may be the mean (i.e., average) of the top fifty action candidates.

In some embodiments, initial action $a_0$ may be returned after the loop completes. In some embodiment, the loop may repeat K (i.e., the number of optimization iterations) times. In some embodiment, the loop may repeat until the prediction distribution converges with historical observations. A sequence of actions $a_{0:H}$ (i.e., a sequence of recommended actions along the planning horizon) may be generated as a result of the optimization. The initial action $a_0$ may be the first action in the sequence. In some embodiments, a new sequence of actions may be generated after each pricing action is taken. As a result, only the initial action in the sequence may be used.

Figure 2B:
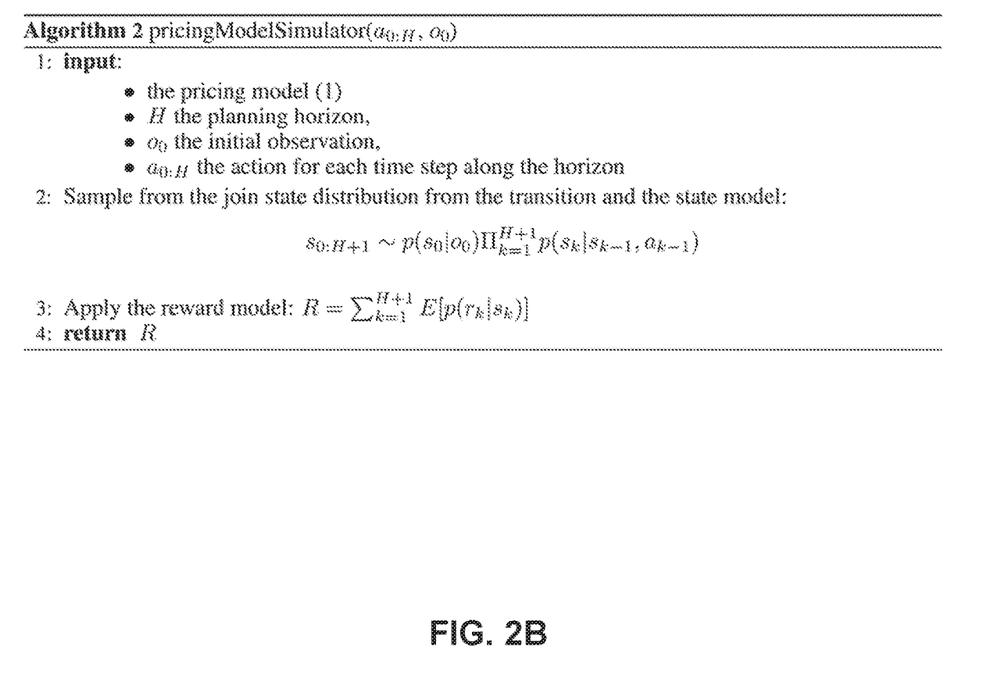
FIG. 2B illustrates an exemplary algorithm for pricing simulation, in accordance with various embodiments.

FIG. 2B illustrates an exemplary algorithm for pricing simulation, in accordance with various embodiments. In some embodiments, the algorithm may be implemented by the pricing model component 114 of FIG. 1. In some embodiments, the algorithm may be included in the simulator model used by the price planning algorithm illustrated in FIG. 2A. The pricing simulation algorithm may unroll future events for any sequence of future actions based on the dynamics the pricing model. A predicted total reward accumulated along the unrolled horizon may be calculated. A population-based optimizer may be used to find the best future action sequence under the model.

The algorithm illustrated in FIG. 2B may receive as inputs a pricing model, a planning horizon H, an initial observation $o_0$, and a set of actions $a_{0:H}$ for each time step along the planning horizon. A state distribution may be sampled from a joint distribution of a transition model and a state model. Initial state $a_0$ may be obtained from the state model based on initial observation $o_0$. Each subsequent state $s_k$ may iteratively be obtained from the transition model based on the previous state $s_{k-1}$ and the previous action $a_{k-1}$ until state $s_H$ (i.e., the final state on the planning horizon) is obtained. The set of actions $a_{0:H}$ may include each pervious action $a_{k-1}$. An accumulative reward R may be calculated by summing each reward $r_k$ across all time steps. Each reward $r_k$ may be predicted by a reward model at each time step based on state $s_k$. The pricing simulation algorithm may return the accumulative reward R.

Returning to FIG. 1, the pricing action component 116 may be configured to generate a price for at least one current trip request on the ride-hailing platform based on the updated set of pricing candidates. In some embodiments, the current pricing action may include the initial action $a_0$ returned by the algorithm illustrated in FIG. 2A. In some embodiment, the price may include a pricing candidate selected from the set of pricing candidates. In some embodiments, generating the price for the at least one current trip request may include generating a pricing multiplier for multiplying with a base price of the at least one current trip request. For example, action $a_t$ may represent multipliers which may be exerted on top of the base price for each OD pair. The dimension of $a_t$ may equal $n^2$ (i.e., the number of grid cells squared), with each component representing the pricing delta for a particular OD pair. $a_t$ may be either discrete or continuous. For example, a discrete action may be selected from the set {0.4, 0.7, 1.0, 1.3, 1.6}. If the action for an OD pair ij is set to 0.7, then the prices of all orders going from i to j will be multiplied by 0.7.

Figure 3:
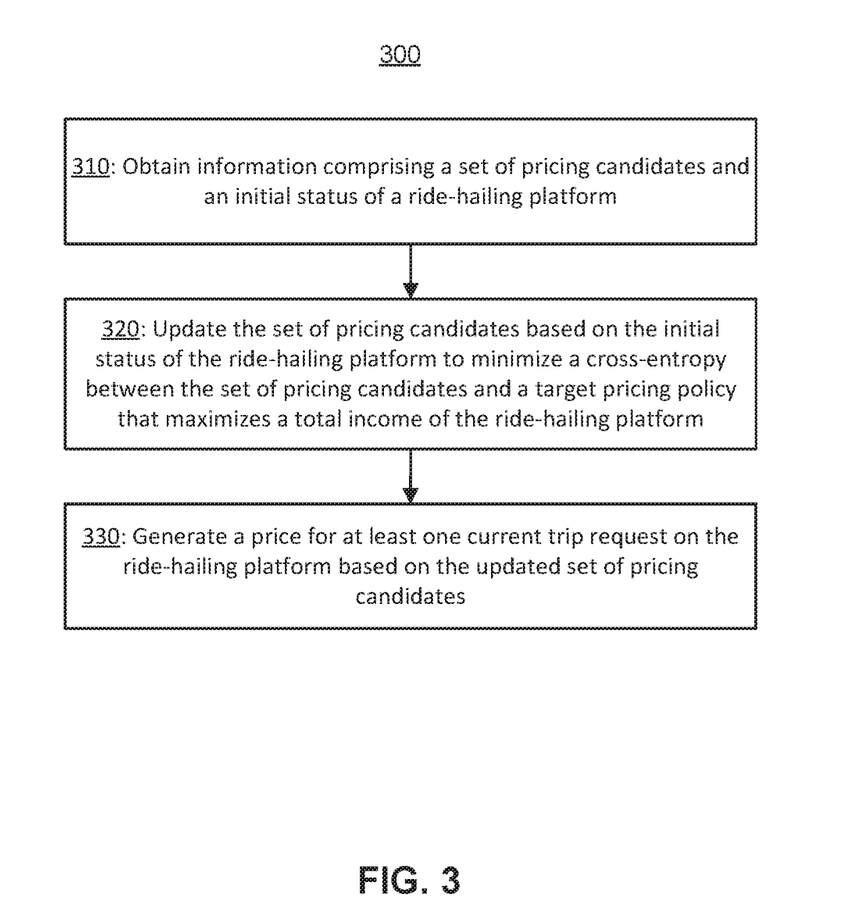
FIG. 3 illustrates a flowchart of an exemplary method, according to various embodiments of the present disclosure.

FIG. 3 illustrates a flowchart of an exemplary method 300, according to various embodiments of the present disclosure. The method 300 may be implemented in various environments including, for example, the system 100 of FIG. 1. The method 300 may be performed by computing system 102. The operations of the method 300 presented below are intended to be illustrative. Depending on the implementation, the method 300 may include additional, fewer, or alternative steps performed in various orders or in parallel. The method 300 may be implemented in various computing systems or devices including one or more processors.

With respect to the method 300, at block 310, information comprising a set of pricing candidates and an initial status of a ride-hailing platform may be obtained. At block 320, the set of pricing candidates may be updated based on the initial status of the ride-hailing platform to minimize a cross-entropy between the set of pricing candidates and a target pricing policy that maximizes a total income of the ride-hailing platform. At block 320, a price for at least one current trip request on the ride-hailing platform may be generated based on the updated set of pricing candidates.

Figure 4:
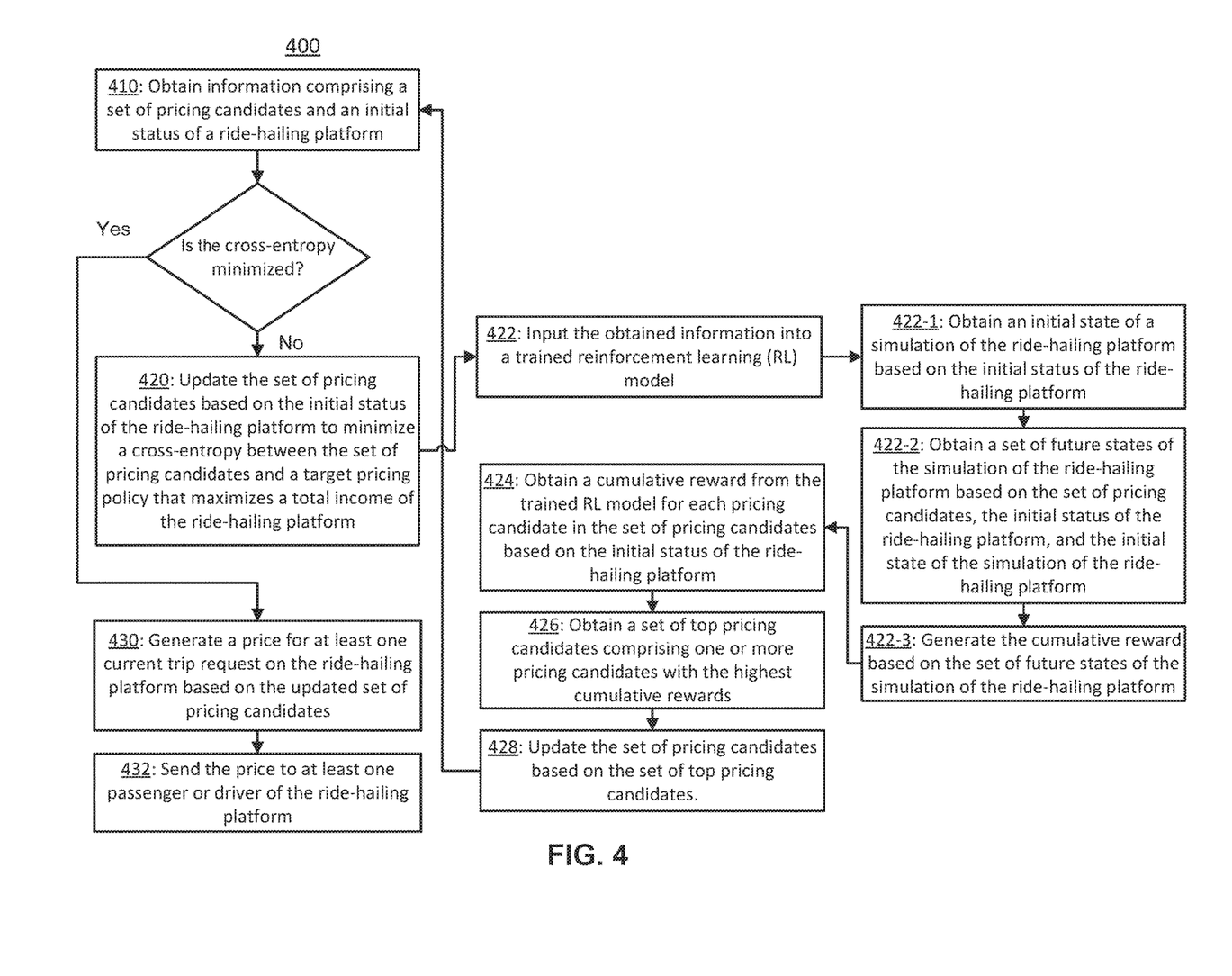
FIG. 4 illustrates a flowchart of an exemplary method, according to various embodiments of the present disclosure.

FIG. 4 illustrates a flowchart of an exemplary method 400, according to various embodiments of the present disclosure. The method 400 may be implemented in various environments including, for example, the system 100 of FIG. 1. The method 400 may be performed by computing system 102. The operations of the method 400 presented below are intended to be illustrative. Depending on the implementation, the method 400 may include additional, fewer, or alternative steps performed in various orders or in parallel. The method 400 may be implemented in various computing systems or devices including one or more processors.

With respect to the method 400, at block 410, information comprising a set of pricing candidates and an initial status of a ride-hailing platform may be obtained. At block 415, it may be determined whether the cross-entropy between the set of pricing candidates and a target pricing policy is minimized. If the cross-entropy is not minimized, the method may proceed to block 420. At block 420, the set of pricing candidates may be updated based on the initial status of the ride-hailing platform to minimize a cross-entropy between the set of pricing candidates and a target pricing policy that maximizes a total income of the ride-hailing platform. The process of updating the set of pricing candidates may include iteratively performing the following step. At block 422, the obtained information may be input into a trained reinforcement learning (RL) model. At block 422-1, an initial state of a simulation of the ride-hailing platform may be obtained based on the initial status of the ride-hailing platform. At block 422-2, a set of future states of the simulation of the ride-hailing platform may be obtained based on the set of pricing candidates, the initial status of the ride-hailing platform, and the initial state of the simulation of the ride-hailing platform. At block 422-3, the cumulative reward may be generated based on the set of future states of the simulation of the ride-hailing platform. At block 424, a cumulative reward from the trained RL model for each pricing candidate in the set of pricing candidates may be obtained based on the initial status of the ride-hailing platform. At block 426, a set of top pricing candidates comprising one or more pricing candidates with the highest cumulative rewards may be obtained. At block 428, the set of pricing candidates may be updated based on the set of top pricing candidates. The method 400 may iterate back to block 410. During iterations, the obtained information may include the updated set of pricing candidates. If it is determined at block 415 that the cross-entropy between the set of pricing candidates and a target pricing policy is minimized, the process may proceed to block 430. At block 430, a price for at least one current trip request on the ride-hailing platform may be generated based on the updated set of pricing candidates. At block 432, the price may be sent to at least one passenger or driver of the ride-hailing platform.

Figure 5:
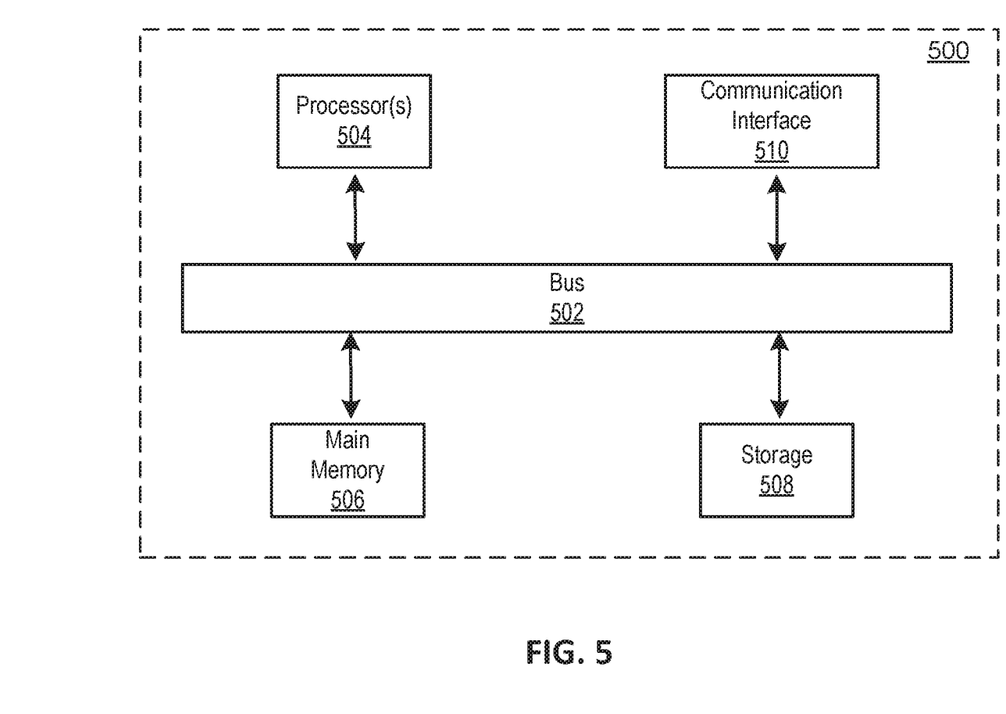
FIG. 5 is a block diagram that illustrates a computer system upon which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render computer system 500 into a special-purpose machine that is customized to perform the operations specified in the instructions. Main memory 506 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 508. Execution of the sequences of instructions contained in main memory 506 causes processor(s) 504 to perform the process steps described herein.

For example, the computing system 500 may be used to implement the computing system 102, the information obtaining component 112, the pricing model component 114, and the pricing action component 116 shown in FIG. 1. As another example, the process/method shown in FIGS. 2A-4 and described in connection with this figure may be implemented by computer program instructions stored in main memory 506. When these instructions are executed by processor(s) 504, they may perform the steps of methods 300 and 400 as shown in FIGS. 3-4 and described above. In alternative embodiments, hard-wired circuitry may be used in place of or in combination with software instructions.

The computer system 500 also includes a communication interface 510 coupled to bus 502. Communication interface 510 provides a two-way data communication coupling to one or more network links that are connected to one or more networks. As another example, communication interface 510 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method for dynamic pricing, comprising:
    training a reinforcement learning (RL) model in a simulation of a ride-hailing platform to predict a future state of the simulation based on a previous state of the simulation and a previous pricing action, wherein the training comprises minimizing a divergence between the predicted future state of the simulation and an observed futured state of the simulation, and the simulation is an offline version of the ride-hailing platform;
    obtaining information comprising a set of pricing candidates and an initial status of the ride-hailing platform, wherein the initial status comprises a number of available drivers and a number of trip requests from passengers of the ride-hailing platform;
    updating the set of pricing candidates based on the initial status of the ride-hailing platform to minimize a cross-entropy between the set of pricing candidates and a target pricing policy that maximizes a total income of the ride-hailing platform, wherein the updating comprises:
        inputting the obtained information into the trained RL model;
        obtaining a cumulative reward from the trained RL model for each pricing candidate in the set of pricing candidates based on the initial status of the ride-hailing platform;
        obtaining a set of top pricing candidates comprising one or more pricing candidates with the highest cumulative rewards; and
        updating the set of pricing candidates based on the set of top pricing candidates; and
    generating a price for at least one current trip request on the ride-hailing platform based on the updated set of pricing candidates;
    collecting an observed status of the ride-hailing platform after the generated price is deployed online;
    retraining the RL model to reach a convergence between the prediction of the future status of the ride-hailing platform and the observed status of the ride-hailing platform.

2. The method of claim 1, wherein the initial status of the ride-hailing platform further comprises a status of at least one origin-destination (OD) pair associated with an origin grid region and a destination grid region.

3. The method of claim 2, wherein the status of the at least one OD pair comprises: a running estimate of a number of created orders, a number of accepted orders at a set of price increment, a number of finished orders at the set of price increment, and a number of canceled orders due to time running out.

4. The method of claim 1, wherein the set of pricing candidates comprise a plurality of historical pricing sequences sampled from a set of historical pricing sequences.

5. The method of claim 1, wherein the set of pricing candidates comprise a plurality of randomly generated pricing sequences.

6. The method of claim 1, wherein obtaining the cumulative reward from the trained RL model comprises:
    obtaining an initial state of the simulation of the ride-hailing platform based on the initial status of the ride-hailing platform;
    obtaining a set of future states of the simulation of the ride-hailing platform based on the set of pricing candidates, the initial status of the ride-hailing platform, and the initial state of the simulation of the ride-hailing platform; and
    generating the cumulative reward based on the set of future states of the simulation of the ride-hailing platform.

7. The method of claim 6, wherein generating the cumulative reward based on the set of future states of the simulation of the ride-hailing platform comprises summing a state reward for each state of the set of future states of the simulation of the ride-hailing platform.

8. The method of claim 7, wherein the trained RL model comprises:
    a transition neural network configured for determining a prediction of each future state of the simulation of the ride-hailing platform based on a previous state of the simulation of the ride-hailing platform and a previous pricing action;
    an observation neural network configured for determining a set of future observations of the simulation of the ride-hailing platform based on each future state of a simulation of the ride-hailing platform;
    a state neural network configured for determining each future state of the simulation of the ride-hailing platform based on each future observation of the simulation of the ride-hailing platform; and
    a reward neural network configured for determining each state reward based on each future state of the simulation of the ride-hailing platform.

9. The method of claim 8, wherein the training further comprises maximizing a predicted accumulative reward.

10. The method of claim 7, wherein the trained RL model comprises:
    a recurrent neural network configured for determining a set of recurrent states of the simulation of the ride-hailing platform based on a set of pervious recurrent states of the simulation of the ride-hailing platform, a set of previous states of the simulation of the ride-hailing platform, and a set of previous pricing actions of the simulation of the ride-hailing platform;
    a transition neural network configured for determining a prediction of each future state of the simulation of the ride-hailing platform based on each recurrent state of the simulation of the ride-hailing platform;
    an observation neural network configured for determining a set of future observations of the simulation of the ride-hailing platform based on each recurrent state of the simulation of the ride-hailing platform and each future state of the simulation of the ride-hailing platform;

a state neural network configured for determining each future state of the simulation of the ride-hailing platform based on a set of previous observations the simulation of the ride-hailing platform and the set of previous pricing actions; and a reward neural network configured for determining each state reward based on each recurrent state of the simulation of the ride-hailing platform and each future state of the simulation of the ride-hailing platform.

11. The method of claim 10, wherein the training further comprises: maximizing a data log-likelihood of obtaining each future observation and each state reward.

12. The method of claim 1, wherein generating the price for the at least one current trip request comprises generating a pricing multiplier for multiplying with a base price of the at least one current trip request.

13. A system for dynamic pricing, comprising one or more processors and one or more non-transitory computer-readable memories coupled to the one or more processors and configured with instructions executable by the one or more processors to cause the system to perform operations comprising:

training a reinforcement learning (RL) model in a simulation of a ride-hailing platform to predict a future state of the simulation based on a previous state of the simulation and a previous pricing action, wherein the training comprises minimizing a divergence between the predicted future state of the simulation and an observed futured state of the simulation;

obtaining information comprising a set of pricing candidates and an initial status of the ride-hailing platform, wherein the initial status comprises a number of available drivers and a number of trip requests from passengers of the ride-hailing platform;

updating the set of pricing candidates based on the initial status of the ride-hailing platform to minimize a cross-entropy between the set of pricing candidates and a target pricing policy that maximizes a total income of the ride-hailing platform, wherein the updating comprises:

inputting the obtained information into the trained RL model;

obtaining a cumulative reward from the trained RL model for each pricing candidate in the set of pricing candidates based on the initial status of the ride-hailing platform;

obtaining a set of top pricing candidates comprising one or more pricing candidates with the highest cumulative rewards; and updating the set of pricing candidates based on the set of top pricing candidates; and generating a price for at least one current trip request on the ride-hailing platform based on the updated set of pricing candidates;

collecting an observed status of the ride-hailing platform after the generated price is deployed;

retraining the RL model to reach a convergence between the prediction of the future status of the ride-hailing platform and the observed status of the ride-hailing platform.

14. The system of claim 13, wherein obtaining the cumulative reward from the trained RL model comprises:

obtaining an initial state of the simulation of the ride-hailing platform based on the initial status of the ride-hailing platform;

obtaining a set of future states of the simulation of the ride-hailing platform based on the set of pricing candidates, the initial status of the ride-hailing platform, and the initial state of the simulation of the ride-hailing platform; and generating the cumulative reward based on the set of future states of the simulation of the ride-hailing platform.

15. The system of claim 14, wherein generating the cumulative reward based on the set of future states of the simulation of the ride-hailing platform comprises summing a state reward for each state of the set of future states of the simulation of the ride-hailing platform.

16. A non-transitory computer-readable storage medium configured with instructions executable by one or more processors to cause the one or more processors to perform operations comprising:

training a reinforcement learning (RL) model in a simulation of a ride-hailing platform to predict a future state of the simulation based on a previous state of the simulation and a previous pricing action, wherein the training comprises minimizing a divergence between the predicted future state of the simulation and an observed futured state of the simulation;

obtaining information comprising a set of pricing candidates and an initial status of the ride-hailing platform, wherein the initial status comprises a number of available drivers and a number of trip requests from passengers of the ride-hailing platform;

updating the set of pricing candidates based on the initial status of the ride-hailing platform to minimize a cross-entropy between the set of pricing candidates and a target pricing policy that maximizes a total income of the ride-hailing platform, wherein the updating comprises:

inputting the obtained information into the trained RL model;

obtaining a cumulative reward from the trained RL model for each pricing candidate in the set of pricing candidates based on the initial status of the ride-hailing platform;

obtaining a set of top pricing candidates comprising one or more pricing candidates with the highest cumulative rewards; and updating the set of pricing candidates based on the set of top pricing candidates; and generating a price for at least one current trip request on the ride-hailing platform based on the updated set of pricing candidates;

collecting an observed status of the ride-hailing platform after the generated price is deployed;

retraining the RL model to reach a convergence between the prediction of the future status of the ride-hailing platform and the observed status of the ride-hailing platform.

* * * * *